(12) United States Patent
Shoemake et al.

(10) Patent No.: US 8,577,403 B2
(45) Date of Patent: Nov. 5, 2013

(54) WIRELESS ETHERNET ADAPTER

(75) Inventors: Matthew B. Shoemake, Allen, TX (US); Greg Christison, Fairview, TX (US)

(73) Assignee: QUALCOMM Incorporated, San Diego, CA (US)

( * ) Notice: Subject to any disclaimer, the term of this patent is extended or adjusted under 35 U.S.C. 154(b) by 551 days.

(21) Appl. No.: 12/197,184

(22) Filed: Aug. 22, 2008

(65) Prior Publication Data

US 2009/0053999 A1    Feb. 26, 2009

Related U.S. Application Data

(60) Provisional application No. 60/957,224, filed on Aug. 22, 2007.

(51) Int. Cl.
*H04B 7/00* (2006.01)

(52) U.S. Cl.
USPC .................... 455/512; 455/513; 455/67.11

(58) Field of Classification Search
USPC ........... 455/402, 450, 451, 452.1, 452.2, 455, 455/8, 9, 41.1, 41.2, 507, 509, 512, 513, 455/67.11
See application file for complete search history.

(56) References Cited

U.S. PATENT DOCUMENTS

| | | | |
|---|---|---|---|
| 6,757,522 B1 * | 6/2004 | Naegeli et al. | 455/67.11 |
| 7,729,659 B2 * | 6/2010 | Molisch et al. | 455/41.2 |
| 7,756,101 B2 * | 7/2010 | Tervonen et al. | 370/348 |
| 2005/0070320 A1 * | 3/2005 | Dent | 455/516 |
| 2005/0255878 A1 | 11/2005 | Leinonen et al. | |
| 2006/0252418 A1 * | 11/2006 | Quinn et al. | 455/423 |
| 2007/0054618 A1 * | 3/2007 | Lewis et al. | 455/41.2 |
| 2007/0077819 A1 | 4/2007 | Thomson et al. | |
| 2008/0107098 A1 * | 5/2008 | Spencer et al. | 370/347 |
| 2008/0155097 A1 * | 6/2008 | Tan | 709/225 |

FOREIGN PATENT DOCUMENTS

| | | |
|---|---|---|
| JP | 2002335252 A | 11/2002 |
| JP | 2003087855 A | 3/2003 |
| JP | 2003249935 A | 9/2003 |
| JP | 2006332835 A | 12/2006 |

OTHER PUBLICATIONS

"International Search Report and Written Opinion—PCT/US2008/074121, International Search Authority—European Patent Office—Sep. 2, 2009.".

* cited by examiner

*Primary Examiner* — Ping Hsieh
(74) *Attorney, Agent, or Firm* — Nicholas J. Pauley; Sam Talpalatsky; Joseph Agusta

(57) ABSTRACT

A method for providing wireless Ethernet connectivity over an UWB link includes providing an adapter coupled to an external network via an Ethernet port, monitoring, by the adapter, a plurality of communication channels in an UWB spectrum, establishing a wireless link on a preferred communication channel, and exchanging data between the adapter and a UWB-enabled device over the wireless link.

14 Claims, 6 Drawing Sheets

WIRELESS ETHERNET ADAPTER

PRIORITY DATA

This application claims priority to Provisional Application Ser. No. 60/957,224, filed Aug. 22, 2007, entitled "WIRELESS ETHERNET ADAPTER," the entire disclosure of which is incorporated by reference.

BACKGROUND

It is frequently desirable to provide wireless communication technologies in various applications for convenience, mobility, and efficiency. Several different wireless technologies have emerged that provide short and long range wireless communications among devices and/or networks. For example, Bluetooth® wireless technology has been developed for providing short range wireless communication among various devices such as PCs, laptop computers, personal digital assistants, and mobile phones. The range of communication includes a personal area network (PAN). Bluetooth technology utilizes a frequency-hopping spread spectrum (FHSS) scheme for transmitting radio signals. That is, a carrier is rapidly switched among many frequency channels in a specific sequence or hopping pattern. The communicating devices are synchronized to a common clock and the frequency hopping pattern. This provides robustness in the system for avoiding interference with other devices and/or networks utilizing similar frequency channels.

As another example, Wi-Fi® wireless technology has been developed for providing long range wireless Internet connectivity to Wi-Fi enabled devices within a hotspot that is covered by one or more access points. The range of communication includes a local area network (LAN). Wi-Fi technology utilizes a constant communication channel that is shared by all the devices within the hotspot. For security, Wi-Fi technology implements various encryption techniques for protecting data transmitted between Wi-Fi radios and access points.

Although these wireless technologies have been generally adequate for their intended purpose, they have not been satisfactory in all respects. As one example, these wireless technologies provide a relatively small bandwidth for transmitting data over a radio channel. As such, the potential data transmission speed which is proportional to the bandwidth of the channel and the logarithm of the signal-to-noise ratio is limited by the relatively small bandwidth. With the emergence of Gigabyte Ethernet technology for wired Internet connectivity, the limited bandwidth of these traditional wireless technologies prevents them from taking full advantage of the very high data transmission speeds (e.g., up to 1 Gbps) that are available.

Ultra-wideband (UWB) technology has been developed for wireless communication that uses a wideband of the RF spectrum for transmitting data. As such, UWB technology has a limited interference range with other wireless technologies and includes more available channels for communication. Additionally, each UWB channel may have a bandwidth greater than 500 MHz. In this way, UWB technology is able to transmit more data in a given period of time. However, UWB is not currently suited for use with technologies and/or applications that require high bandwidth such as Gigabyte Ethernet technology. Therefore, what is needed is an apparatus and method for providing Ethernet connectivity over an ultra-wideband (UWB) link to maximize data transmission speed in a wireless local area network.

SUMMARY

A method and apparatus is provided for providing Ethernet connectivity in an ultra-wideband (UWB) communication system. The method includes providing an adapter coupled to an external network via an Ethernet port, monitoring, by the adapter, a plurality of communication channels in an UWB spectrum, establishing a wireless link on a preferred communication channel, and exchanging data between the adapter and an UWB-enabled device over the wireless link.

The apparatus includes an RF transceiver for transmitting and receiving radio signals over the UWB link, a PHY layer for configuring a plurality of communication channels in an UWB spectrum for the RF transceiver, a Media Access Control (MAC) layer for providing a mechanism for addressing and channel access for the PHY layer, and a memory having instructions for: monitoring the plurality of communication channels in the UWB spectrum; establishing a wireless link on a communication channel with a least amount of usage; and exchanging data with an UWB-enabled device over the wireless link.

Also, an apparatus is provided which includes a plug adapted for connecting to an Ethernet port, receiving a power signal, and connecting to an Ethernet connection, a processor coupled to the plug for receiving data via the Ethernet connection and for processing the data for transmission over an UWB link, and an antenna for transmitting the processed data over the UWB link.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. Furthermore, all features may not be shown in all drawings for simplicity.

DETAILED DESCRIPTION

The present invention relates generally to transmission and encryption systems. It is understood, however, that the following disclosure provides many different embodiments, or examples, for implementing different features of the invention. Specific examples of components and arrangements are described below to simplify the present disclosure. These are, of course, merely examples and are not intended to be limiting.

Figure 1A:
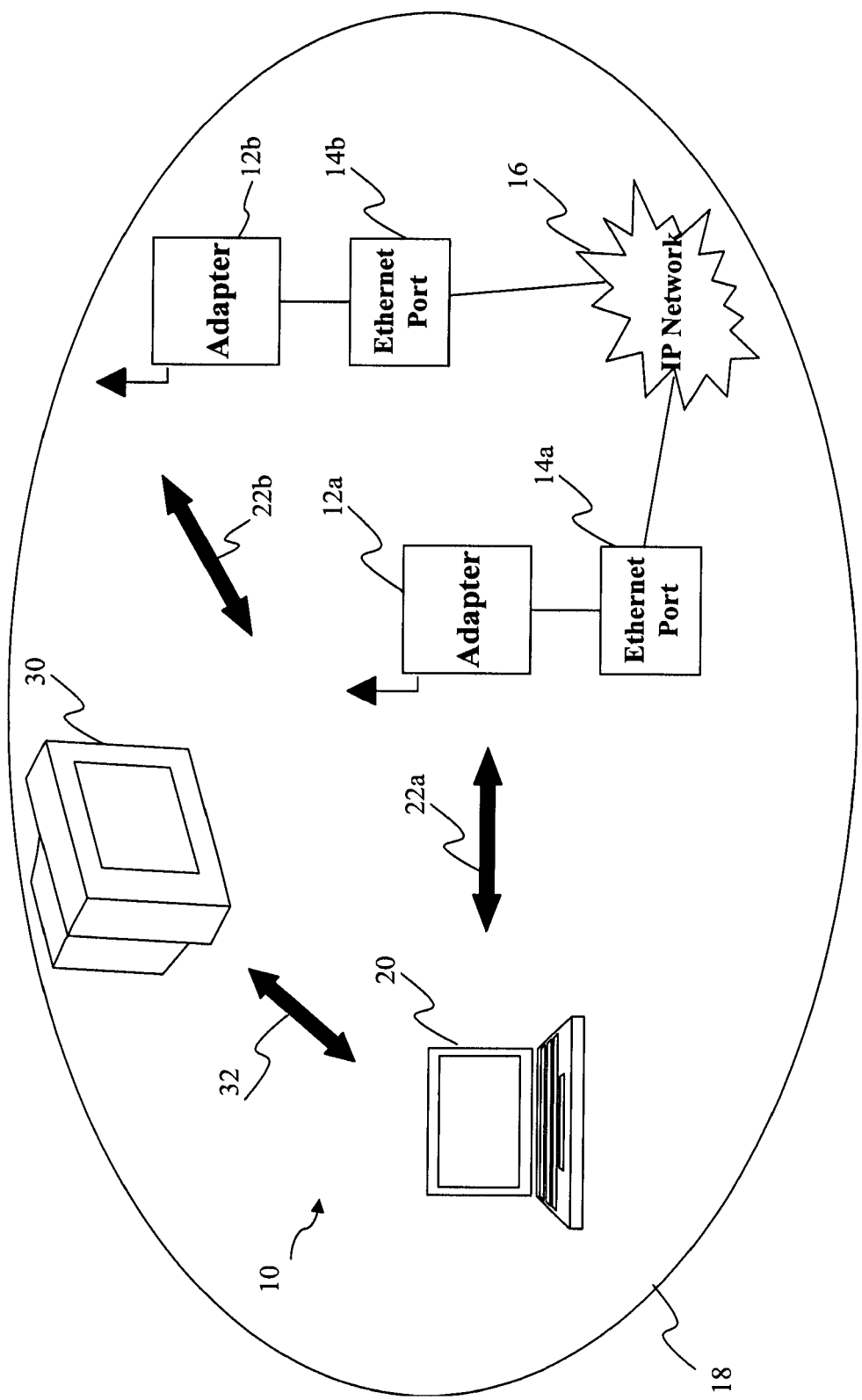
FIG. 1A is a perspective view of a system for providing Ethernet connectivity over an ultra-wideband (UWB) link according to various aspects of the present disclosure.

Referring to FIG. 1A, a system 10 is an example of a communications network that can benefit from one or more embodiments of the present disclosure. The system 10 includes a wireless local area network (WLAN) and/or wireless personal area network (WPAN). The system 10 may be implemented as an ultra wideband (UWB) system. The UWB system utilizes an unlicensed frequency spectrum between 3.1 and 10.6 GHz which is divided into fourteen (14) bands, each with a bandwidth of 528 MHz. Accordingly, the UWB system is capable of providing data transmission speeds of up to 1 Gbps or more for short range (e.g., a few meters) wireless communications.

The UWB system may utilize an orthogonal frequency-division multiplexing (OFDM) scheme for transmitting information. OFDM is a form of wireless multi-carrier modulation wherein carrier spacing is selected so that each sub-carrier is orthogonal to the other sub-carriers. This orthogonality avoids adjacent channel interference and prevents the demodulators from seeing frequencies other than their own. The OFDM signal includes a plurality of sub-carriers, each sub-carrier is modulated with a conventional modulation scheme (e.g., quadrature amplitude modulation). In the UWB system of the disclosed embodiment, the OFDM signal includes 128 sub-carriers (also referred to as tones) that are used per band, of which, 100 are data sub-carriers, 12 are for pilot information, 10 are guard tones, and 6 are null tones carrying no information.

The system 10 includes one or more Ethernet adapters 12a, 12b each directly coupled to a wired Gigabyte Ethernet port 14a, 14b. The Ethernet port 14a, 14b provides connectivity to a network 16 such as the Internet. The Ethernet port 14a, 14b utilizes a Transmission Control Protocol/Internet Protocol (TCP/IP) for exchanging data. TCP/IP is known in the art and thus not described in detail herein. The Ethernet port 14a, 14b is configured to provide data transmission speeds of up to 1 Gbps. Also, the Ethernet port 14a, 14b provides a power supply connection for powering the adapter 12a, 12b and thus, no additional wiring is needed for the adapter. The adapter 12a, 12b bridges Ethernet connectivity over an UWB link to cover the local area 18 with high speed wireless Internet connectivity. Even though the disclosed embodiment provides Gigabyte Ethernet connectivity over the UWB link, it is understood that the adapter may alternatively be used to provide wireless connectivity of future technologies that require high bandwidth.

In the disclosed embodiment, the adapter 12a, 12b provides wireless Internet connectivity to a laptop computer 20 that is within a local area 18 (e.g., a few meters). Even though one laptop computer 20 is shown, it is understood that the adapter 12a, 12b may provide wireless Internet connectivity to more than one laptop computer and/or desktop computer within the local area 18. The adapter 12a, 12b communicates 22a, 22b with the laptop computer 20 on a radio channel in the UWB frequency spectrum. The laptop computer 20 is enabled with TCP/IP stacks over its UWB link as will be described later. The adapter 12a, 12b includes an UWB transceiver for wirelessly transmitting and/or receiving OFDM modulated data to and from UWB enabled devices such as the laptop computer 20. The UWB transceiver may be implemented as a chip providing a radio frequency (RF) transceiver. The adapter 12a, 12b further includes a baseband Physical (PHY) Layer that is capable of data transmission speeds of up to 1 Gbps. The adapter 12a, 12b further includes a Media Access Control (MAC) Layer for providing network timing, addressing, and channel access control mechanisms for the PHY Layer. The PHY and MAC Layers may be configured in compliance with standards such as the WiMedia or ECMA-368/369. The PHY and MAC Layers may be combined in an integrated circuit (IC). The adapter 12 may further include an adaptation layer that allows the MAC layer to interface with the TCP/IP protocol stack. As such, the adapter 12a, 12b is able to take advantage of the high data transmission speed provided by the Gigabyte Ethernet port 14a, 14b. These various components may be provided in a chipset available at WiQuest Communications, Inc., 915 Enterprise Blvd., Suite 200, Allen, Tex., 75013.

The system 10 may include other UWB enabled devices within the local area 18, that wirelessly communicate with the laptop computer 20 in the UWB spectrum. For example, a display device 30 may wireless communicate with the laptop computer 20 over an UWB link 32. As such, the laptop computer 20 is configured to transmit video signals to the display device 30 over the UWB link 32. Additionally, it is understood that the local area 18 may also be supported by other types of wireless technologies that operate in licensed and unlicensed frequency bands that overlap with the UWB spectrum. Accordingly, the adapter 12 includes firmware for monitoring the available channels in the UWB spectrum to determine which channel has the least amount of traffic or usage. The adapter 12 is able to switch channels and notify the laptop computer 20 of the switch in order to maximize throughput as will be described later.

Figure 1B:
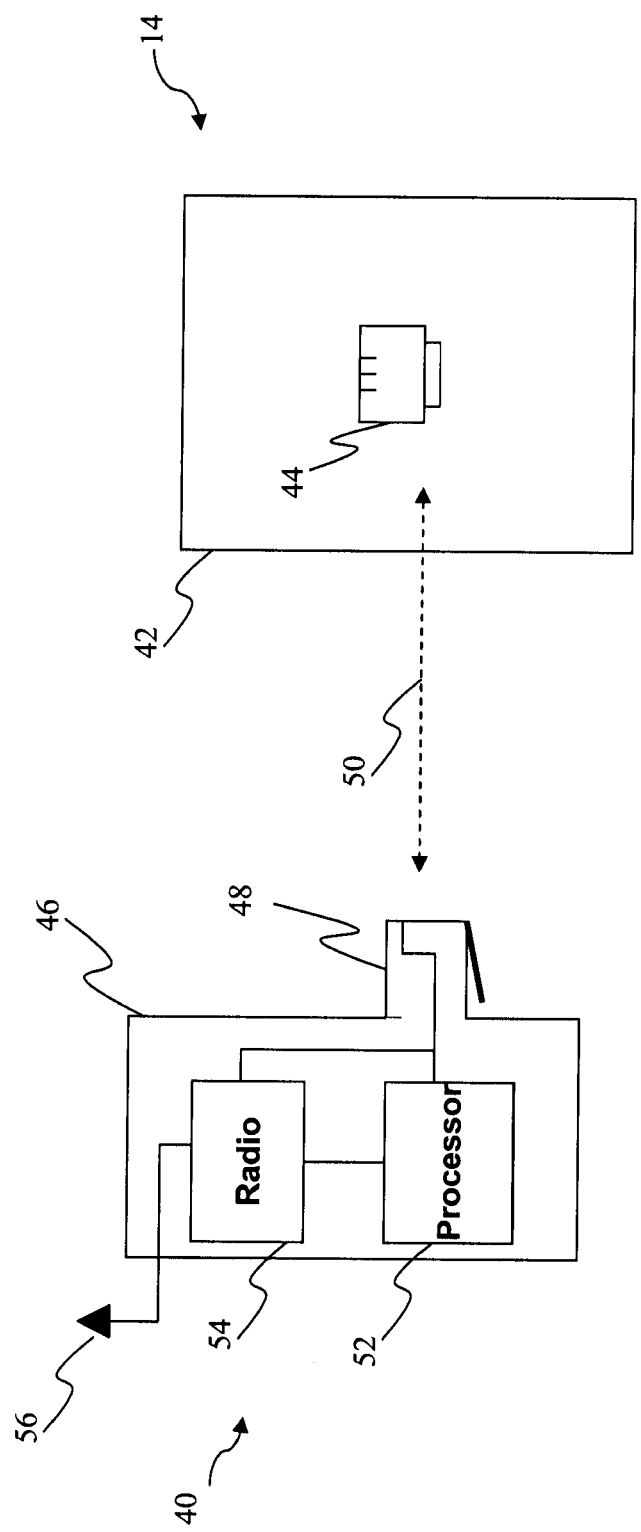
FIG. 1B is a perspective view of an adapter and Ethernet port that may be implemented in the system of FIG. 1A.

Referring to FIG. 1B, illustrated is a perspective view of an adapter 40 for connecting to the wired Gigabyte Ethernet port 14 of FIG. 1A. For example, an establishment such as an office building may include many Ethernet ports 14 located throughout the office. The adapter 40 provides wireless Ethernet connectivity over an UWB link to UWB-enabled devices within communication range. The Ethernet port 14 may be located on a wall outlet 42 and includes a connector 44 such as a female jack for connecting to the network 16 (FIG. 1A) as was discussed above. The adapter 40 may include a housing 46 having a connector 48, such as a male plug, configured to mate 50 with the connector 44 on the wall outlet 42. The adapter 40 may include a processor 52 for receiving data from the Ethernet port 14 in a first format, and processing and converting the data to a second format suitable for transmitting over the UWB link. The data transmission over the UWB link may be secured by encryption or other suitable techniques. Also, the processor 52 may receive data from an UWB-enabled device over the UWB link, and may process and covert the data for transmitting over the network 16 (FIG. 1A). The processor 52 may include PHY and MAC layers as was described above. The adapter 40 may further include an RF radio 54 coupled to an antenna 56 for transmitting data over the UWB link. Further, a power signal is also provided by the Ethernet port 14 to power the processor 52 and radio 54. As such, the adapter 40 does not require additional wiring for power connections.

Figure 2:
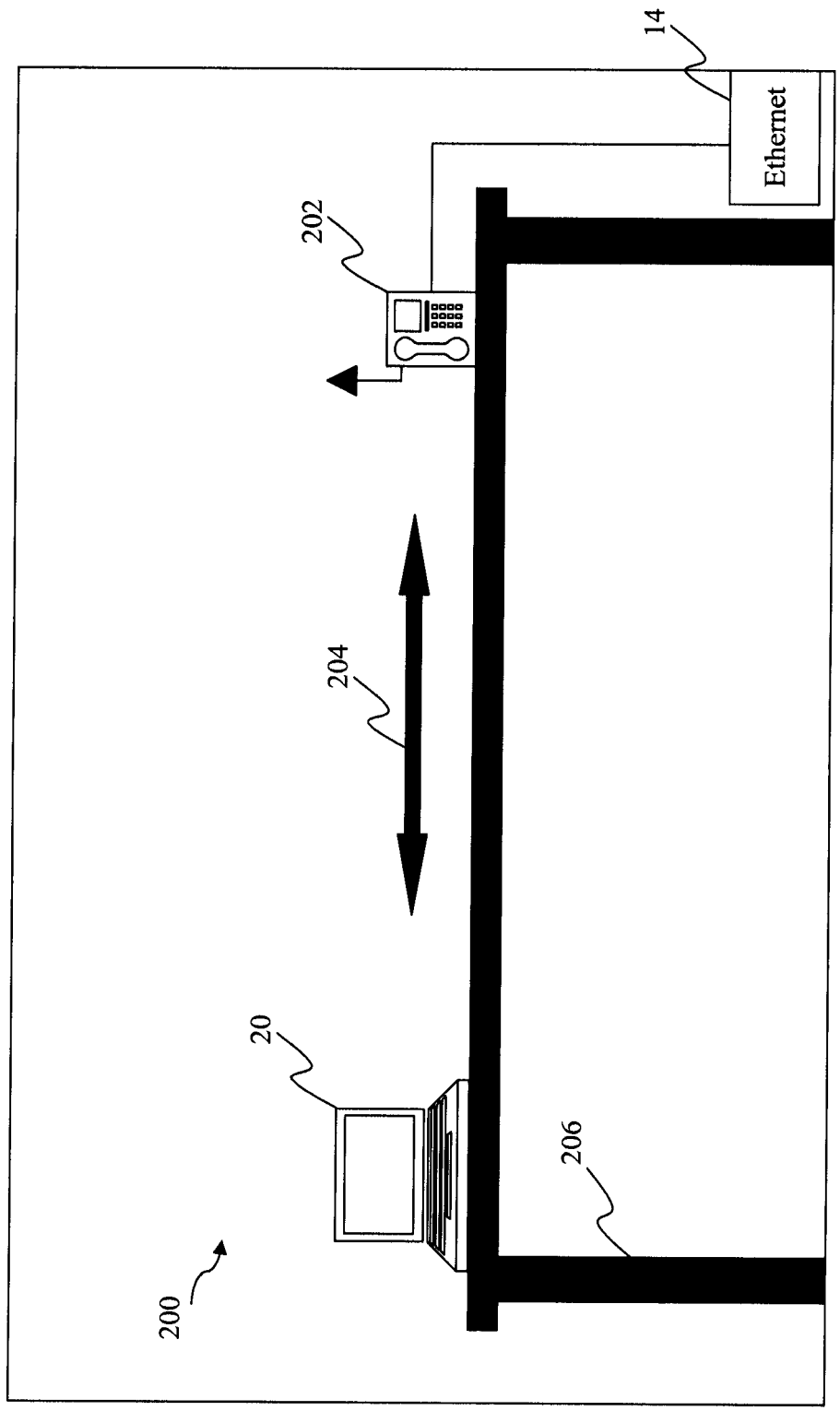
FIG. 2 is a perspective view of alternative system that utilizes an IP telephone for providing Ethernet connectivity over an UWB link.

Referring to FIG. 2, illustrated is a perspective view of an alternative system 200 for providing Ethernet connectivity utilizing an IP telephone 202. Similar features in FIGS. 1 and 2 are numbered the same for simplicity and clarity. The IP telephone 202 is configured with hardware and software to support Voice over Internet Protocol (VoIP) technology. VoIP is known in the art and thus, not described in detail herein. The IP telephone 202 includes an Ethernet connector for connecting to a wired Ethernet port such as a wired Gigabyte Ethernet port 14. The wired Gigabyte Ethernet port is coupled to a network such as the Internet. The IP telephone 202 further includes a TCP/IP enabled UWB bridge similar to the Ethernet adapter 12 of FIG. 1. In this way, the IP telephone 202 is capable of providing wireless Internet connectivity over a UWB link 204 at data transmission speeds of up to 1 Gbps. The IP telephone 202 is typically disposed on a table 206 such that the UWB radio of the IP telephone is near a laptop computer 20. As such, the IP telephone 202 provides for a more reliable and better wireless connectivity to the laptop computer 20.

Figure 3:
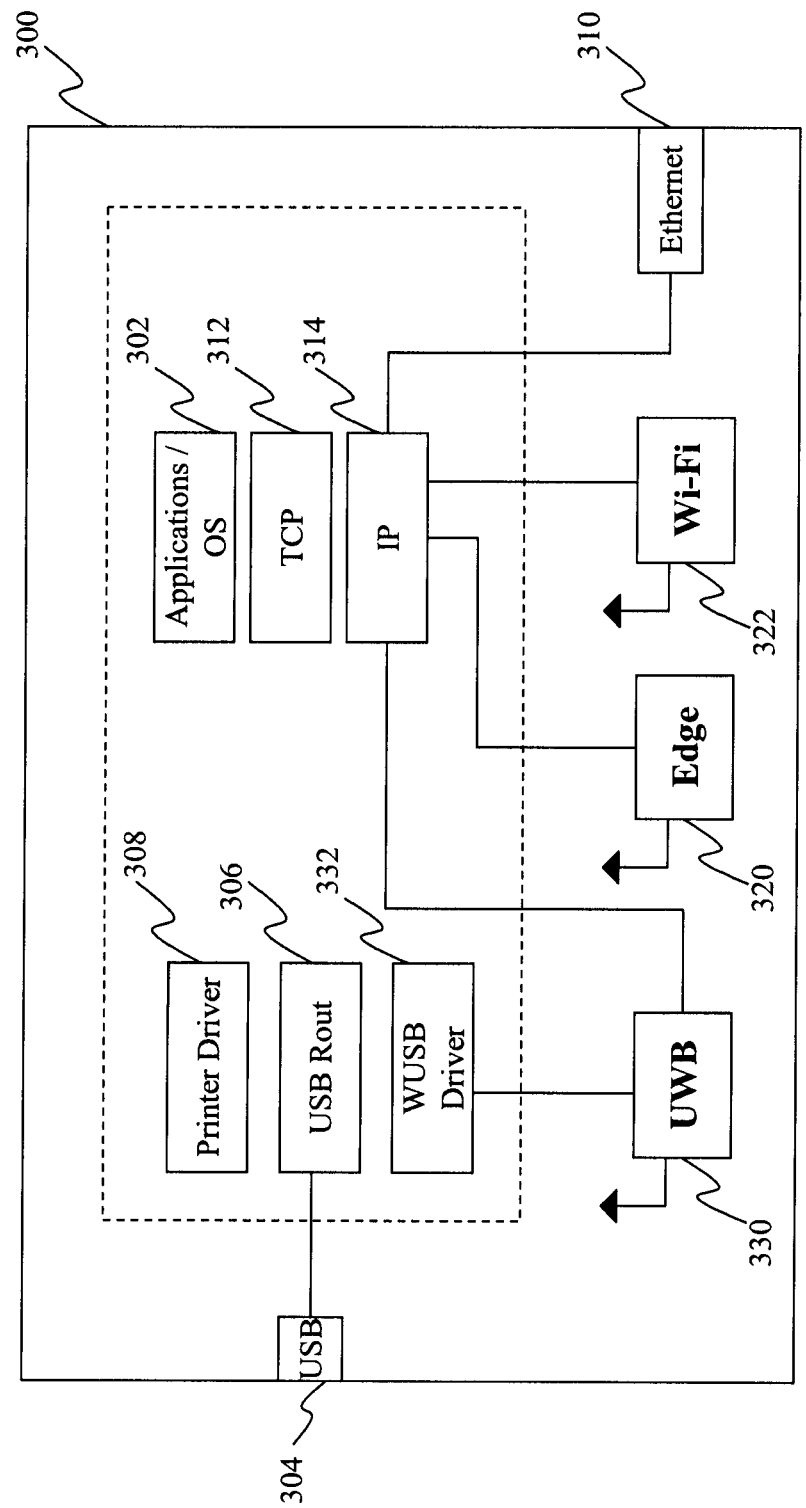
FIG. 3 is a simplified diagrammatic view of a laptop computer including hardware and software for supporting various wired and wireless technologies.

Referring to FIG. 3, illustrated is a simplified diagrammatic view of a laptop computer 300 including hardware and software for supporting a plurality of technologies including USB, Edge, WiFi, Ethernet, and UWB. The laptop computer 300 may be utilized in the systems of FIGS. 1 and 2. The laptop computer 300 includes an operating system (OS)/applications 302 for coordinating and controlling various components of the laptop computer. For example, the laptop computer 300 includes a USB port 304 for interfacing with and connecting to various peripherals such as a keyboard, mouse, printer, scanner, and other USB devices. The USB port 304 may be coupled to a USB controller or router 306. In the disclosed embodiment, the laptop computer 300 includes various device drivers such as a printer driver 308 for operating a printer (not shown) that is connected via the USB port 304.

The laptop computer 300 further includes an Ethernet port 310 for interfacing with and connecting to a network such as the Internet via wired Gigabyte Ethernet technology. As such, the laptop computer 300 also includes a TCP/IP stack 312, 314 for supporting data exchange in TCP/IP standard protocol. The laptop computer 300 may further include an Edge subsystem 320 and WiFi subsystem 322 for supporting wireless communications with Edge and WiFi technology known in the art. The Edge and WiFi subsystems 320, 322 are linked to the TCP/IP stack 312, 314 to provide wireless Internet connectivity to the laptop computer 300. However, these wireless technologies have limited bandwidth and thus, the data transmissions speeds of these technologies are much slower than the available speeds provided by Gigabyte Ethernet technology.

The laptop computer 300 further includes an UWB subsystem 330 for wirelessly communicating with the Ethernet adapter 12 of FIG. 1A, the adapter plug 40 of FIG. 1B, or the IP telephone 202 of FIG. 2. As previously discussed, the Ethernet adapters and IP telephone may be coupled to a wired Gigabyte Ethernet port which provides connectivity to the Internet. The Ethernet adapters and IP telephone are configured to provide data transmission speeds of up to 1 Gbps on a radio channel in the UWB spectrum. The UWB subsystem 330 may connect to the laptop computer via an add-in board inserted into an expansion slot. The UWB subsystem 330 includes an RF transceiver for wirelessly receiving and/or transmitting OFDM modulated data from and to the adapters or the IP telephone. The UWB subsystem 330 further includes PHY and MAC Layers that may be similar to the one described for the Ethernet adapter of FIG. 1A. The UWB subsystem 330 is linked to the TCP/IP stack 312, 314 such that the laptop computer 300 is capable of wireless Internet connectivity over the UWB link. In this way, the laptop computer 300 can take full advantage of the high data transmission speeds of Gigabyte Ethernet technology for applications such as streaming video or other applications that require high bandwidth. Also, the UWB subsystem 330 may be linked to a wireless USB driver 332 known in the art such that the laptop computer can control and operate USB devices that are coupled to or enabled with UWB links.

Figure 4A:
FIGS. 4A and 4B are diagrammatic views of a plurality of frequency bands in an UWB system, and a plurality of successive superframes being transmitted on an UWB channel, respectively.
Figure 4B:
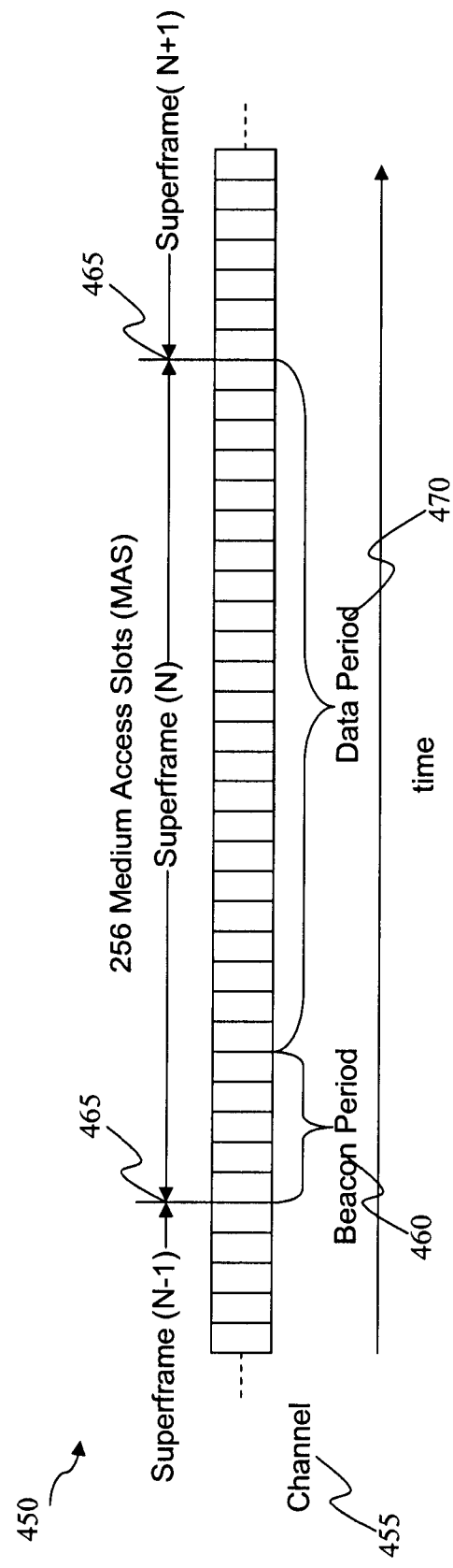

Referring to FIGS. 4A and 4B, illustrated are diagrammatic views of a plurality of frequency bands in an UWB system that are available for communication between UWB enabled devices, and a plurality of successive superframes being transmitted on a radio channel within the UWB system, respectively. In FIG. 4A, the PHY layer provides that the UWB spectrum 400 is divided into fourteen (14) bands 401-404, each band having a bandwidth of about 528 MHz. The fourteen bands are further defined into five band groups, of which, four band groups each comprise three bands and one band group comprises two bands. Within each of the first four band groups, the PHY Layer defines four time frequency codes (TFC) using time frequency interleaving (TFI) and three TFC using fixed frequency interleaving (FFI), and thus, the PHY Layer provides support for up to seven channels per band. In the fifth band group, the PHY Layer defines two TFC using FFI. Accordingly, a total of thirty channels are specified in the PHY Layer. As such, the UWB system has a limited interference range with other wireless technologies and includes more available channels for communication. As previously described, the UWB system utilizes an orthogonal frequency-division multiplexing (OFDM) scheme for transmitting information. The OFDM signal includes 128 sub-carriers (also referred to as tones) that are used per band, of which, 100 are data sub-carriers, 12 are for pilot information, 10 are guard tones, and 6 are null tones carrying no information.

In FIG. 4B, successive superframes (e.g., N−1, N, N+1, etc.) 450 are shown being transmitted over a time period on a channel 455 in the UWB spectrum. As provided by the MAC Layer, a superframe is a periodic time interval used to coordinate frame transmissions between devices in the UWB system. Each superframe includes a total of 256 time slots (also referred to as medium access slots (MAS)), each time slot having a duration of 256 µs. Each superframe starts with a beacon period 460 occupying several time slots in which communicating devices synchronize with one another. That is, all devices communicating within a piconet must synchronize their beacon period starting time 465 with one another. The beacon period is also used for creating time slot reservations (e.g., distributed reservation protocol (DRP)) for the various devices in the UWB system, and for conveying management and control information using information elements (IE). The beacon period is followed by a data period 470 in which data transmission occurs.

In the disclosed embodiment, the Ethernet adapter 12 of FIG. 1A, adapter plug 40 of FIG. 1B, or IP telephone 202 of FIG. 2 may transmit a beacon period 460 at the beginning of each superframe 450 to coordinate communications with UWB enabled devices within radio range such as the laptop computer 300 of FIG. 3. The beacon period 460 includes information regarding which time slots in the data period may be reserved for transmitting and receiving data to and from the laptop computer as well as management and control information. Additionally, the adapter may reserve several time slots for scanning the UWB system in order to monitor the other channels for traffic or usage. The laptop computer may synchronize its beacon period 460 to the adapter's beacon in the selected channel. As such, data exchange (during the data period 470) between the adapter and laptop computer can begin over the selected channel.

Figure 5:
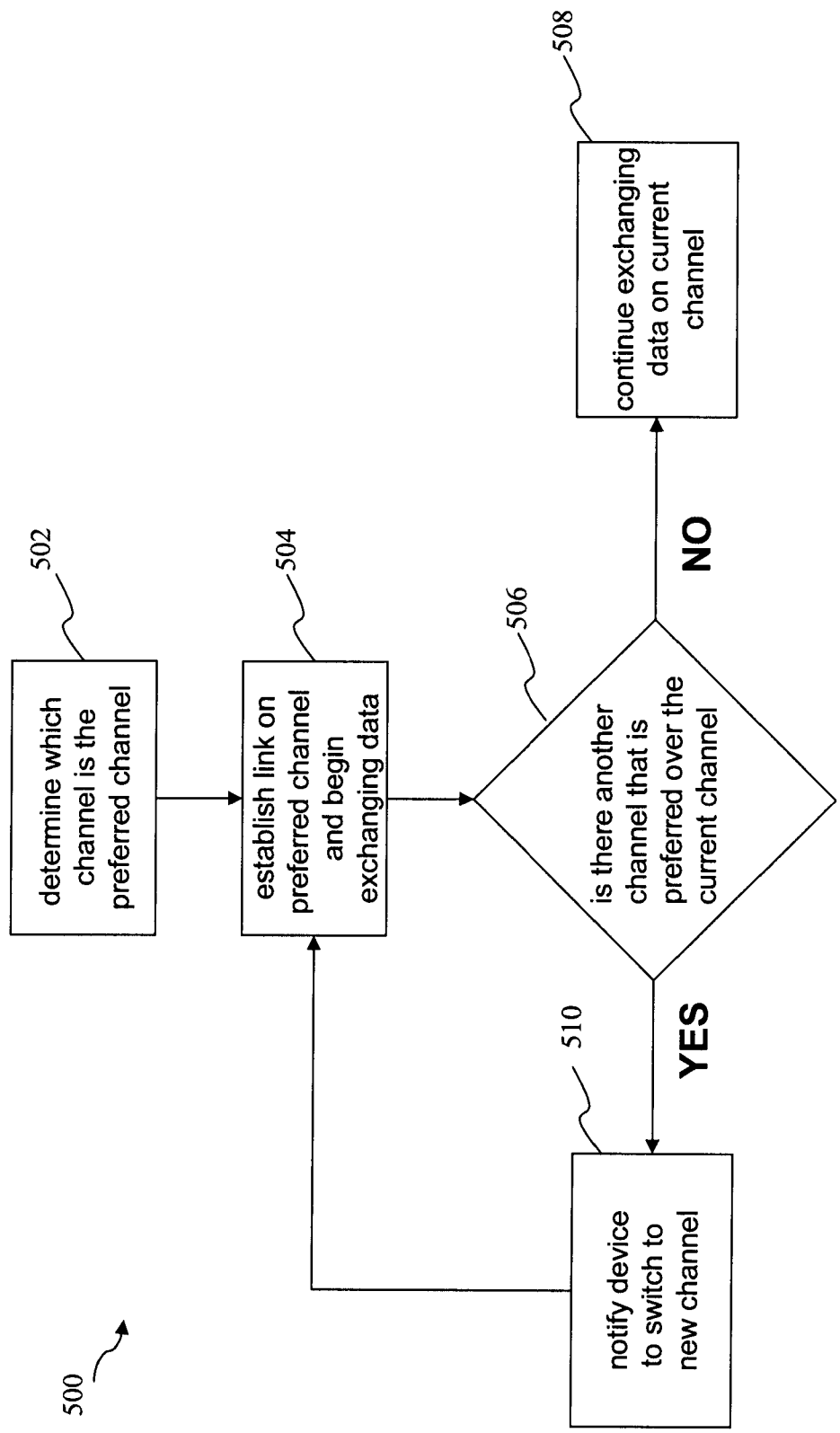
FIG. 5 is a flowchart of a method for providing Ethernet connectivity over an UWB link that may be implemented in the systems of FIGS. 1 and 2.

Referring to FIG. 5, illustrated is a flowchart of a method 500 for providing wireless Ethernet connectivity over a UWB link that may be implemented by the Ethernet adapter 12 of FIG. 1A, adapter plug 40 of FIG. 1B, or the UWB bridge of the IP telephone 202 of FIG. 2. The method 500 may be implemented as firmware provided with the MAC Layer. The method 500 begins with step 502 in which the adapter determines, from a plurality of channels in an UWB system, a preferred channel for communicating over the UWB link. The preferred channel may be selected from a variety of factors. For example, the preferred channel may be selected as the channel with the least amount of usage or traffic. Alternatively, the preferred channel may be selected as the channel with a good signal-to-noise ratio. Further, the preferred channel may be selected from a combination of factors. The method 500 continues with step 504 in which the adapter establishes an UWB link over the preferred channel that was determined from the previous step 502. As such, the adapter establishes wireless connectivity with a laptop computer over its UWB link and/or other UWB enabled device and begins exchanging data (e.g., TCP/IP) over the preferred channel.

The method 500 continues with step 506 in which the adapter periodically monitors the plurality of channels to decide whether to switch channels for data transmission. The adapter may reserve several time slots in the data period to listen to all the other available channels in the UWB system to determine if another channel is preferred for the UWB link. If no, the method 500 continues with step 508 in which the adapter continues with data transmission on the current channel.

If yes, the method 500 continues with step 510 in which the adapter switches to the new channel that is preferred and notifies the laptop computer of the switch by a switching mechanism. For example, the adapter may include a channel change information element (IE) in a beacon period sent on the current channel. The channel change IE includes a new channel number. Also, the adapter may further include a channel change count field to a remaining number of superframes before it switches to the new channel. As such, the channel change count field is decremented by one following each successive superframe. When the count field reaches zero, the method 500 repeats step 504 in which the adapter establishes the UWB link and begins data transmission on the new channel on the next superframe.

Each of the above-mentioned components can be implemented as computer software, electrical logic, or combinations thereof. Also, although components are shown separately in the figures, in some embodiments one or more of the components on either side of the wireless link may be combined into a single integrated circuit device, or a group of devices.

Thus, provided is

The present disclosure has been described relative to a preferred embodiment. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

Several different advantages exist from these and other embodiments. In addition to providing wireless Internet connectivity at data transmission speeds of up to 1 Gbps, the UWB system disclosed herein has a limited interference range with other wireless technologies due to more radio channels being available for communication and thus, does not have to share channels. Also, the wireless Ethernet adapter includes low power CMOS integrated circuits so that the adapter can be powered via the Ethernet port.

What is claimed is:

1. A method for providing wireless Ethernet connectivity over an ultra-wideband (UWB) link, the method comprising:
    reserving a first time slot of a plurality of time slots associated with a communication channel of a plurality of communication channels in a UWB spectrum to exchange data between an adapter and an UWB-enabled device on the communication channel, the plurality of communication channels defined by time frequency codes;
    reserving a second time slot of the plurality of time slots to monitor the plurality of communication channels to identify a preferred communication channel in the plurality of communication channels based on monitored traffic;
    monitoring the plurality of communication channels at the adapter using the second time slot;
    establishing a wireless link on the preferred communication channel;
    exchanging the data between the adapter and the UWB-enabled device on the preferred communication channel over the wireless link;
    decrementing a channel change count field;
    checking the plurality of communication channels to determine whether a new communication channel has a least amount of usage when the channel change count field reaches a predetermined value;
    switching to the new communication channel if it is determined that the new communication channel has the least amount of usage; and
    notifying the UWB-enabled device of the switch to the new communication channel.

2. The method of claim 1, wherein the preferred communication channel includes a communication channel with a least amount of usage.

3. The method of claim 1, wherein the exchanging data includes exchanging data utilizing orthogonal frequency-division multiplexing (OFDM) signals.

4. The method of claim 1, wherein the adapter is configured with a Physical (PHY) Layer for supporting data transmission speeds of up to 1 gigabit per second (Gbps).

5. The method of claim 1, further comprising powering the adapter by a power connection of the Ethernet port.

6. An apparatus for providing wireless Ethernet connectivity over an ultra-wideband (UWB) link, the apparatus comprising an adapter coupled to an external network via an Ethernet port, the adapter including:
    a radio frequency (RF) transceiver for transmitting and receiving radio signals over the UWB link;
    a physical (PHY) layer for configuring a plurality of communication channels in an UWB spectrum for the RF transceiver, the PHY layer using time frequency codes to define the plurality of communication channels;
    a Media Access Control (MAC) layer for providing a mechanism for addressing and channel access for the PHY layer; and
    a memory having instructions executable at the adapter to:
        route data received from the external network to a UWB-enabled device on a communication channel in the plurality of communication channels over the wireless link;
        reserve a time slot in a plurality of time slots associated with the communication channel to monitor the plurality of communication channels to identify a preferred communication channel based on monitored traffic;

monitor the plurality of communication channels in the UWB spectrum using the time slot;
establish a wireless link on the preferred communication channel;
route data received from the external network to a UWB-enabled device on the preferred communication channel over the wireless link;
decrement a channel change count field;
check the plurality of communication channels to determine whether a new communication channel has a least amount of usage when the channel change count field reaches a predetermined value;
switch to the new communication channel if it is determined that the new communication channel has the least amount of usage; and
transmit a superframe having a channel change information element indicating the new communication channel.

7. The apparatus of claim 6, wherein the preferred communication channel includes a communication channel with a least amount of usage.

8. The apparatus of claim 7, further comprising an internet protocol (IP) telephone that is operatively coupled to the adapter.

9. The apparatus of claim 6, wherein the external network includes the Internet and the Ethernet port includes a Gigabyte Ethernet port.

10. The apparatus of claim 6, wherein the physical (PHY) Layer is configured to support data transmission speeds of up to 1 gigabit per second (Gbps).

11. The apparatus of claim 6, wherein the adapter is powered by a power connection of the Ethernet port.

12. The apparatus of claim 6, wherein the RF transceiver transmits and receives orthogonal frequency-division multiplexing (OFDM) signals.

13. The apparatus of claim 6, wherein the UWB-enabled device includes a laptop computer.

14. A method for providing wireless Ethernet connectivity over an ultra-wideband (UWB) link, the method comprising:
means for reserving a time slot, the means for reserving a time slot to
reserve a first time slot of a plurality of time slots associated with a communication channel of a plurality of communication channels in a UWB spectrum to exchange data between an adapter and an UWB-enabled device on the communication channel, the plurality of communication channels defined by time frequency codes; and
reserve a second time slot of the plurality of time slots to monitor the plurality of communication channels to identify a preferred communication channel in the plurality of communication channels based on monitored traffic;
monitoring the plurality of communication channels at the adapter using the second time slot;
establishing a wireless link on the preferred communication channel;
exchanging the data between the adapter and the UWB-enabled device on the preferred communication channel over the wireless link;
decrementing a channel change count field;
checking the plurality of communication channels to determine whether a new communication channel has a least amount of usage when the channel change count field reaches a predetermined value;
switching to the new communication channel if it is determined that the new communication channel has the least amount of usage; and
notifying the UWB-enabled device of the switch to the new communication channel.

\* \* \* \* \*